United States Patent
Ekambaram et al.

(10) Patent No.: US 8,775,775 B1
(45) Date of Patent: Jul. 8, 2014

(54) DYNAMIC PREFETCH THROTTLING FOR MULTI-CONTROLLER SYSTEMS

(75) Inventors: Dhanabal Ekambaram, Milpitas, CA (US); Pratap Vikram Singh, Mountain View, CA (US)

(73) Assignee: EMC Corporation, Hopkinton, MA (US)

( * ) Notice: Subject to any disclaimer, the term of this patent is extended or adjusted under 35 U.S.C. 154(b) by 602 days.

(21) Appl. No.: 13/077,615

(22) Filed: Mar. 31, 2011

(51) Int. Cl.
*G06F 12/00* (2006.01)
*G06F 13/00* (2006.01)
*G06F 13/28* (2006.01)

(52) U.S. Cl.
USPC ............ 711/213; 711/162; 711/146; 707/674

(58) Field of Classification Search
USPC .......................... 711/146, 162, 213; 707/674
See application file for complete search history.

(56) References Cited

U.S. PATENT DOCUMENTS

| | | | |
|---|---|---|---|
| 6,085,193 A * | 7/2000 | Malkin et al. | 1/1 |
| 6,430,653 B1 * | 8/2002 | Fujikawa | 711/113 |
| 6,718,441 B2 * | 4/2004 | Gonzales et al. | 711/137 |
| 2005/0138195 A1 * | 6/2005 | Bono | 709/231 |
| 2010/0115332 A1 * | 5/2010 | Zheng et al. | 714/6 |

* cited by examiner

*Primary Examiner* — Stephen Elmore
*Assistant Examiner* — Mark Giardino, Jr.
(74) *Attorney, Agent, or Firm* — Van Pelt, Yi & James LLP

(57) ABSTRACT

A method for reading data from data storage is disclosed. A prefetch hint identifying a chunk of data a requesting node anticipates the requesting node will request that a controller retrieve from data storage is received. The prefetch hint is stored in a buffer at the controller. A determination that the prefetch hint is ready for processing is made. The determination is based at least in part on an offset or other data indicating a place of the chunk of data within a sequence of related chunks of data one or more of which may have been read previously into a cache of the controller. The prefetch hint is processed in response to determining that the prefetch hint is ready for processing, including by reading the chunk of data from a data storage of the controller and storing the chunk of data in the cache.

19 Claims, 6 Drawing Sheets

DYNAMIC PREFETCH THROTTLING FOR MULTI-CONTROLLER SYSTEMS

BACKGROUND OF THE INVENTION

Typically, in a read operation in which stored data is retrieved to restore data on a host system, the data to be recovered is determined and located, and is read from storage media and provided to a client in chunks. Some data storage systems increase read throughput by prefetching data. For example, further data chunks expected to be requested and/or required by a client are read into a buffer before the client has actually submitted a request for those chunks. However, in a multi-controller environment for example, prefetching data may hurt performance in some conditions, e.g., when different controllers have unbalanced workloads.

BRIEF DESCRIPTION OF THE DRAWINGS

Various embodiments of the invention are disclosed in the following detailed description and the accompanying drawings.

DETAILED DESCRIPTION

Figure 1:
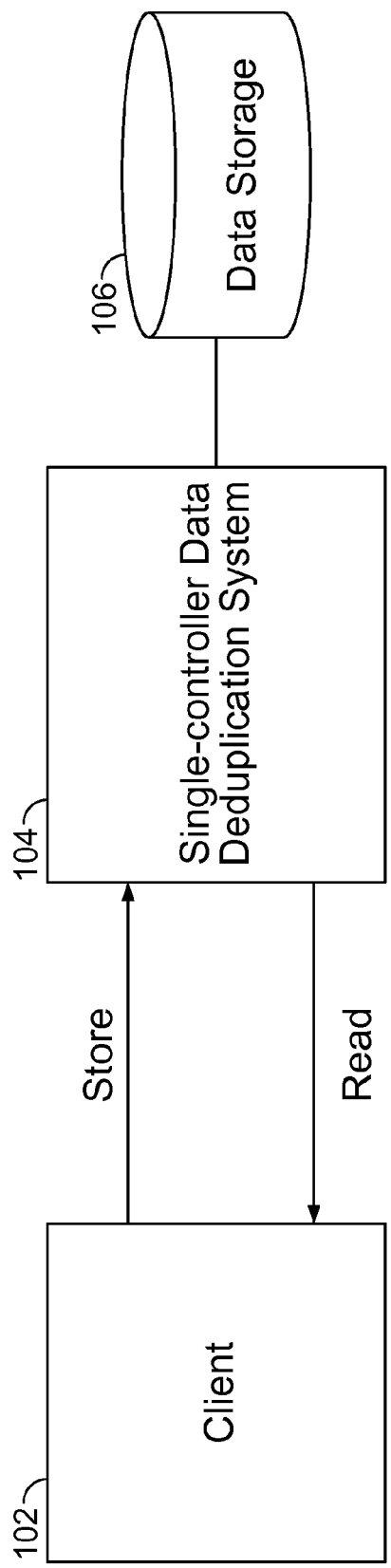
FIG. 1 is a block diagram illustrating an embodiment of a single-controller data deduplication system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamic throttling of prefetch hints, such as in a multi-controller data storage system, is disclosed. In various embodiments, a data recovery plug-in, client, or other agent generates and provides to each of one or more controllers prefetch hints indicating data segments (sometimes referred to herein as data "chunks") that are anticipated to be requested from the controller in connection with a data recovery operation. In various embodiments, the respective controllers are configured to buffer the prefetch hints, and to read the indicated data from a data storage device and into a cache at the controller only upon determining that the prefetch hint is ready for processing. In some embodiments, the determination is based on an offset or other data that is used by the controller to predict how soon the indicated data will actually be requested to be read out and/or to determine whether previously cached data chunks associated with the same requesting node and/or comprising a same file or other data object have been read out from the cache. In various embodiments, the dynamic throttling approach ensures, for example, that data is not prefetched and cached in response to a prefetch hint so long before actually being requested that by the time the request is received and processed the prefetched data has expired or been written over in the cache.

FIG. 1 is a block diagram illustrating an embodiment of a single-controller data deduplication system. As shown in FIG. 1, a client 102 stores a file or other data using single-controller data deduplication system 104 via a storing process. For example, client 102 may be a backup client. Client 102 reads back a stored file or data from single-controller data deduplication system 104 via a read process. For example, client 102 may be a restore client. As will be described in greater detail below, single-controller data deduplication system 104 reduces the amount of storage needed for a given set of files significantly because only unique chunks of data are stored.

During a storing process, single-controller data deduplication system 104 divides a file or a stream of data into chunks of data. Each chunk of data is assigned an identification, which may be calculated using cryptographic hash functions. The identification is known as a signature, or fingerprint, for the chunk of data. If the signature of the current chunk of data is identical to the signature corresponding to another chunk of data previously stored in a data storage 106 (the latter implemented, for example, as a storage disk), then a duplicate is detected. Accordingly, the duplicated chunk of data is not stored again in data storage 106; instead, the duplicated chunk of data is replaced by a reference or a link to the chunk of data previously stored in data storage 106. Conversely, if the signature of the current chunk of data is different from all the signatures corresponding to chunks of data that have been previously stored in data storage 106, then the current chunk of data is a unique new chunk of data and is stored in data storage 106. The signature of the current chunk of data is also stored in an index.

During a read process, a file that has been stored can be reconstructed by reading chunks of data stored in data storage 106 and concatenating them together. Whenever a link or a reference is found, single-controller data deduplication system 104 replaces that link or reference with the referenced data chunk.

The main bottleneck in a read process is the latency associated with reading chunks of data from data storage 106. The latency associated with reading data from memory is smaller than that associated with reading data directly from data storage, such as a storage disk. Therefore, in order to speed up the read process, chunks of data may be prefetched from data storage 106 before the chunks of data are ready to be read. For example, single-controller data deduplication system 104 may look ahead in a restore data stream and fetch the anticipated chunks of data into its memory. When the actual read operation of the anticipated data is executed, data is read from memory rather than directly from data storage, thereby speeding up the read process.

To satisfy clients with more demanding capacity needs, the storage space available to client 102 may be increased by connecting additional single-controller data deduplication systems to client 102 in parallel with single-controller data deduplication system 104. However, this configuration has a drawback. Since the multiple single-controller data deduplication systems are not communicating and coordinating their operations with each other, deduplication cannot be achieved across the multiple systems. For example, duplicate chunks of data may be stored on two or more of the single-controller data deduplication systems, thus reducing the overall deduplicating performance.

Figure 2:
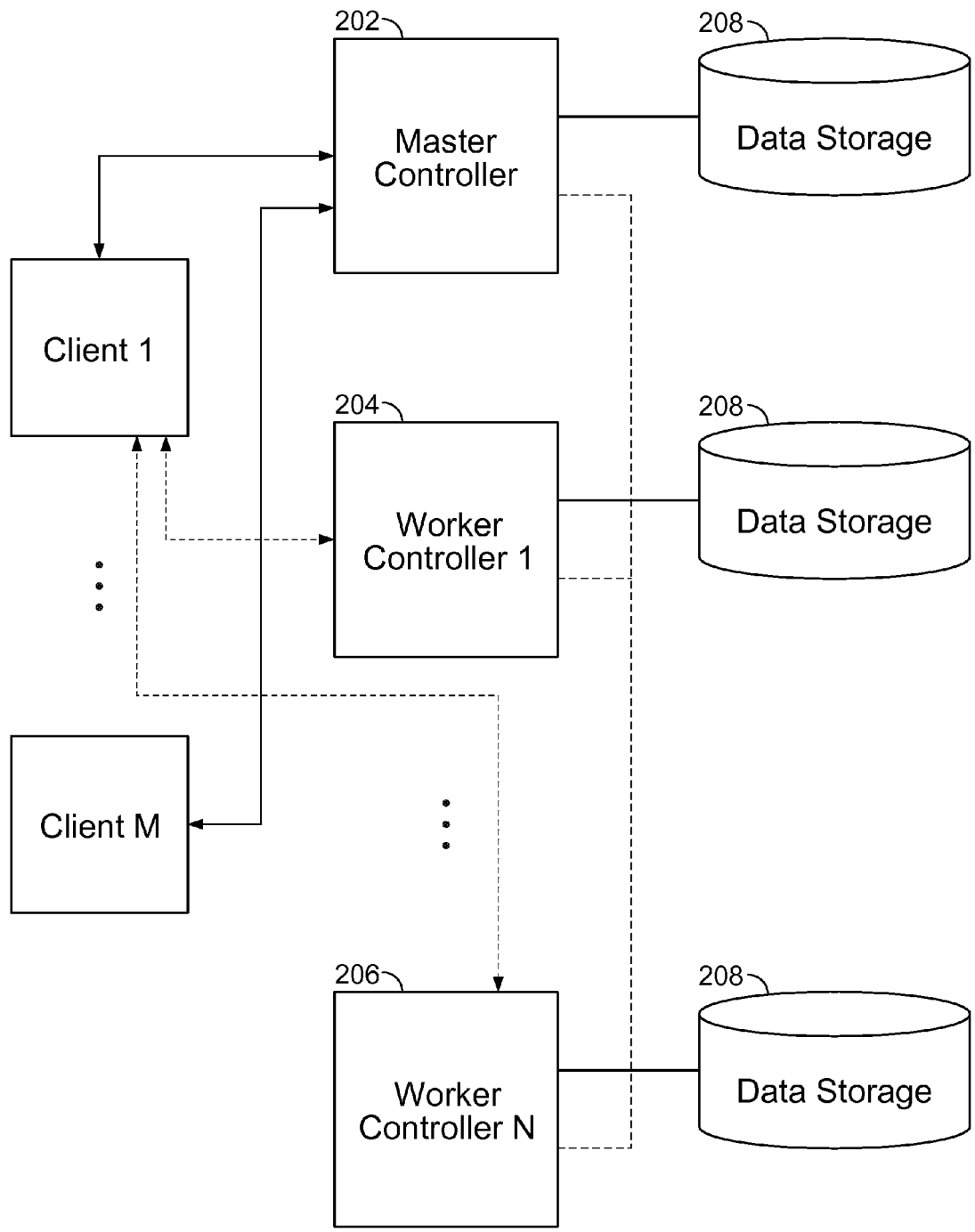
FIG. 2 is a block diagram illustrating an embodiment of a multi-controller data deduplication system.

FIG. 2 is a block diagram illustrating an embodiment of a multi-controller data deduplication system. Unlike a single-controller data deduplication system in which only one controller controls a single data storage, a multi-controller data deduplication system includes a client (e.g., client 1) connected with multiple controllers, including a master controller 202 and N worker controllers (204 and 206), with each controller writing data to and controlling its own data storage 208. In some embodiments, the client may be in communication with each controller using a dedicated communication link, one or more networks, a local area network, a wide area network, a storage area network, the Internet, a wired network, a wireless network, and the like. Note that the multiple controllers may be used to service multiple clients (clients 1 to M) in parallel.

Figure 3:
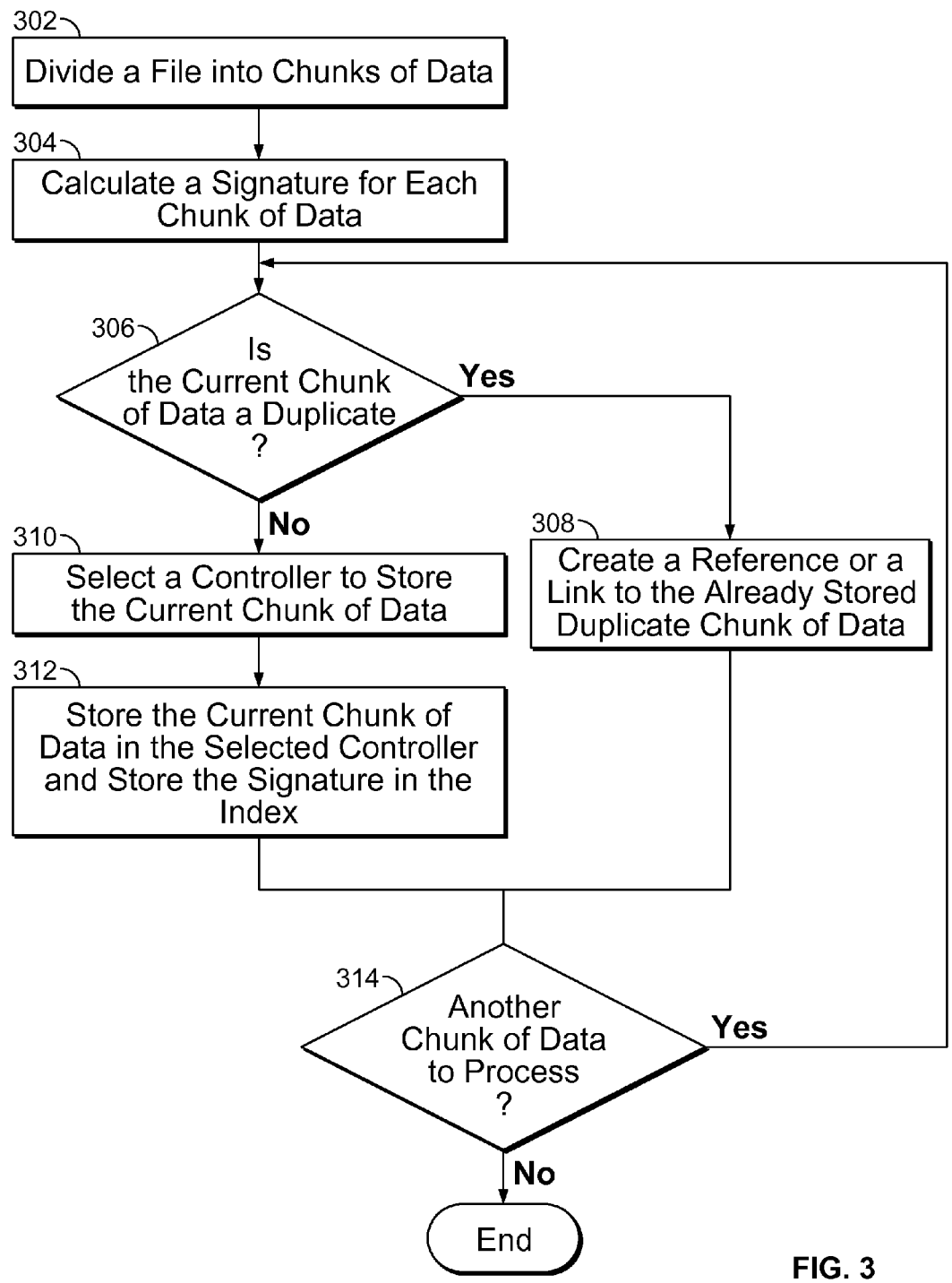
FIG. 3 is a flowchart illustrating an embodiment of a storing process in a multi-controller data deduplication system.

FIG. 3 is a flowchart illustrating an embodiment of a storing process in a multi-controller data deduplication system. For example, the storing process may be a backup process. At 302, a file or a stream of data that needs to be stored in the multi-controller data deduplication system is divided into chunks of data. At 304, for each chunk of data, a signature is calculated. For example, the signature may be calculated using cryptographic hash functions. At 306, it is determined whether the current chunk of data is a duplicate. For example, the signature of the current chunk of data may be compared against an index of signatures, wherein the signatures in the index correspond to other chunks of data that have been previously stored by other controllers into their data storages 208. If the signature of the current chunk of data matches with another signature in the index, then the current chunk of data is a duplicate. Accordingly, the duplicated chunk of data is not stored again by a controller into its data storage 208; instead, at 308, the duplicated chunk of data is replaced by a reference or a link to the matching chunk of data that was previously stored. Conversely, if the signature of the current chunk of data is different from all the signatures in the index, then the current chunk of data is a unique new chunk of data. At 310, a controller is selected to store the current chunk of data. For example, either master controller 202 or the client selects one of the controllers to store the current chunk of data. At 312, the current chunk of data is stored by the selected controller into its data storage 208. In addition, the signature of the current chunk of data is also stored in the index of signatures. In some embodiments, the index of signatures is stored on master controller 202, and the index is called a master index. At 314, if there are more chunks of data to process, the process will repeat at 306 again.

In the example shown in FIG. 3, signature based deduplication is performed globally prior to selecting a controller to store a chunk. In other embodiments, attributes of a data object and/or current segment thereof are used to select a controller expected to do the best job of storing the object (or chunk) without duplication, and signature based deduplication is performed by each respective controller on chunks the controller is asked to store.

Figure 4:
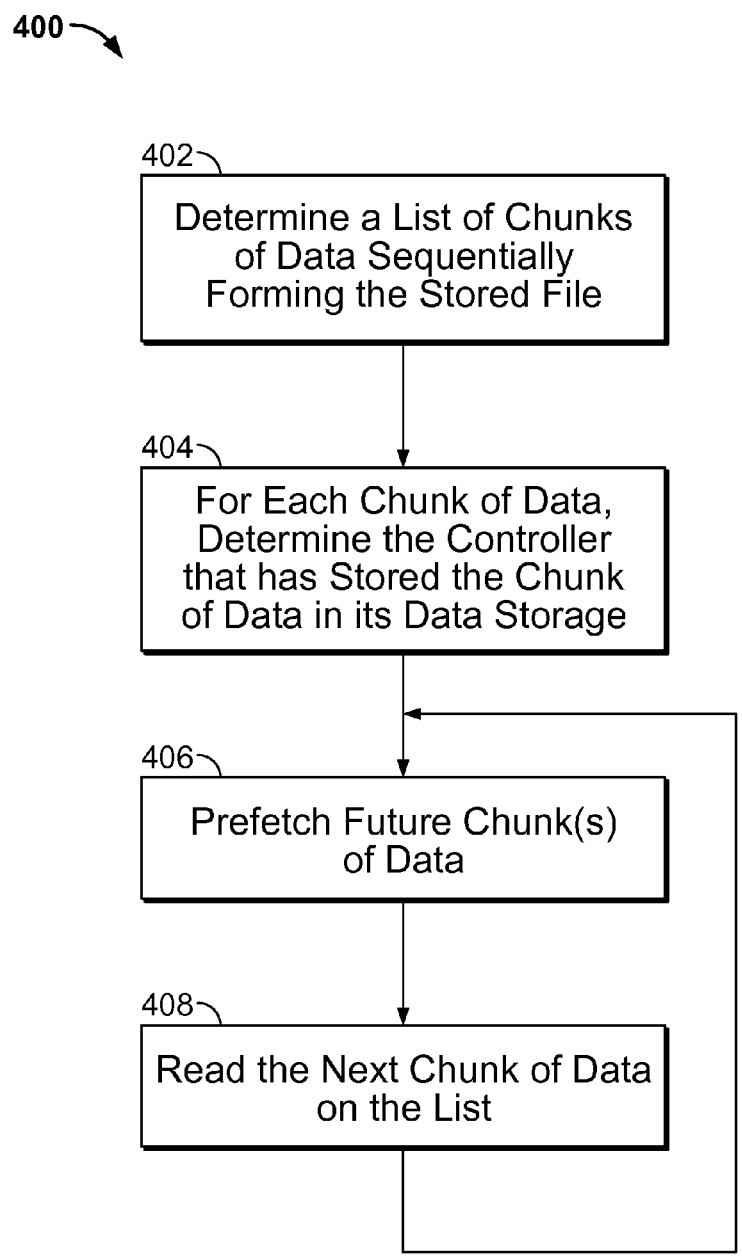
FIG. 4 is a flowchart illustrating an embodiment of a read process 400 in a multi-controller data deduplication system.

FIG. 4 is a flowchart illustrating an embodiment of a read process 400 in a multi-controller data deduplication system. At 402, a list of chunks of data sequentially forming the stored file, e.g., the backup file, is determined. A file that has been stored by the multi-controller data deduplication system can be reconstructed by sequentially reading the chunks of data making up the file from the data storages of the various controllers and concatenating the chunks of data together. Recall that during the storing process, a copy of each chunk of data has been stored in the data storage of one of the controllers, and any chunks of data that are identical to each other share a single stored copy. Therefore, at 404, for each chunk of data on the determined list (obtained from 402), a corresponding controller where a copy of the chunk of data is stored is determined. In some embodiments, master controller 202 includes information for determining which controller has storage of a copy of a particular chunk of data; therefore, in some embodiments, the client may request master controller 202 for such information.

Figure 5:
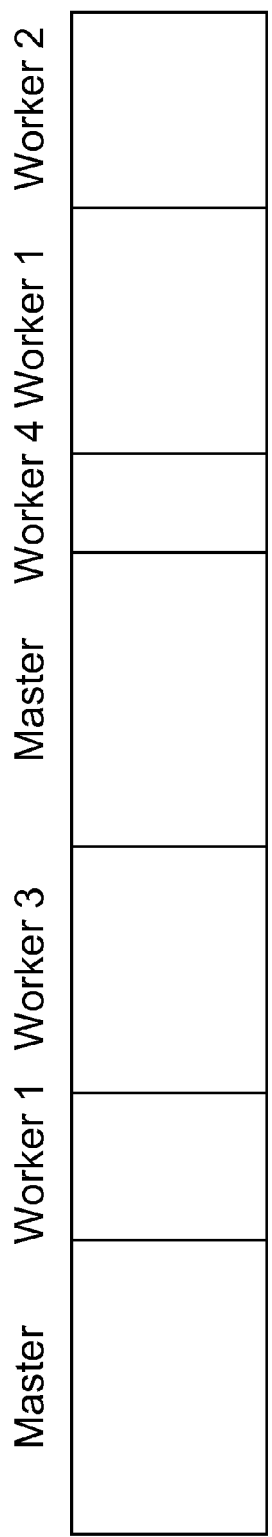
FIG. 5 is a diagram illustrating an embodiment of a list of chunks of data making up a file.

FIG. 5 is a diagram illustrating an embodiment of a list of chunks of data making up a file. As shown in FIG. 5, a copy of the first chunk of data is determined as being stored in the data storage of master controller 202, a copy of the second chunk of data is determined as being stored in the data storage of worker controller 1, a copy of the third chunk of data is determined as being stored in the data storage of worker controller 3, and so forth.

As described earlier, the main bottleneck in a read process is the latency associated with reading chunks of data from data storage. The latency associated with reading data from memory is smaller than that associated with reading data directly from data storage, such as a storage disk. Referring back to FIG. 4, in order to speed up the read process, chunks of data may be prefetched from the various data storages of the controllers at 406 before the chunks of data are ready to be read at 408. For example, the multi-controller data deduplication system shown in FIG. 2 may look ahead in the list of chunks of data (see FIG. 5) and fetch the anticipated chunks of data into its memory. When the actual read operation of the anticipated data is executed, data is read from memory rather than from data storage, thus speeding up the read process.

In some embodiments, a client (see FIG. 2) looks ahead in the list of chunks of data and sends one or more prefetch hints to one or more controllers. When a controller receives a prefetch hint, it is informed by the client that the controller may prefetch the anticipated chunk of data into memory when the controller is ready to do so.

In some embodiments, some of the steps in process 400 may be performed in different orders or performed in parallel. For example, steps 402 and 404 may be performed in parallel. In some embodiments, steps 406 and 408 may be performed in parallel. These two steps may be repeated in a loop until all the chunks of data are read. In some embodiments, a partial list of chunks of data sequentially forming the stored file (part of step 402) and their corresponding list of controllers storing their copies (part of step 404) are determined, and then steps 406 and 408 are performed. These four steps are then repeated in a loop until all the chunks of data are read.

Referring back to FIG. 5, copies of the chunks of data are relatively evenly distributed among the different controllers. However, in some instances, a number of contiguous chunks of data may be all stored in the data storage of a single controller. For example, ten contiguous chunks of data may be all stored in worker controller 1, and ten prefetch hints are sent to worker controller 1. If worker controller 1 processes the ten prefetch hints immediately and fetches the ten chunks of data into the cache one after the other, but the cache has enough space to hold only a portion of the ten chunks of data, then some of the earlier fetched chunks of data will be overwritten by the later fetched chunks of data. In such a situation, when the actual read operations of the overwritten chunks of data are executed, data must be read again from the data storage rather than from the cache. This will hurt performance because some chunks of data are required to be read from the data storage twice.

Note that the above described problem cannot be effectively solved by adjusting how quickly the prefetch hints are sent from a client alone. For example, if one client slows down the sending of prefetch hints to a particular controller, this does not prevent other clients from sending so many prefetch hints to the controller such that the cache runs out of space, and thus requires portions of the cache to be overwritten. Furthermore, slowing down the sending of prefetch hints will decrease the overall performance, because a bigger portion of the chunks of data of a file would end up being read from data storage rather than from memory.

Figure 6:
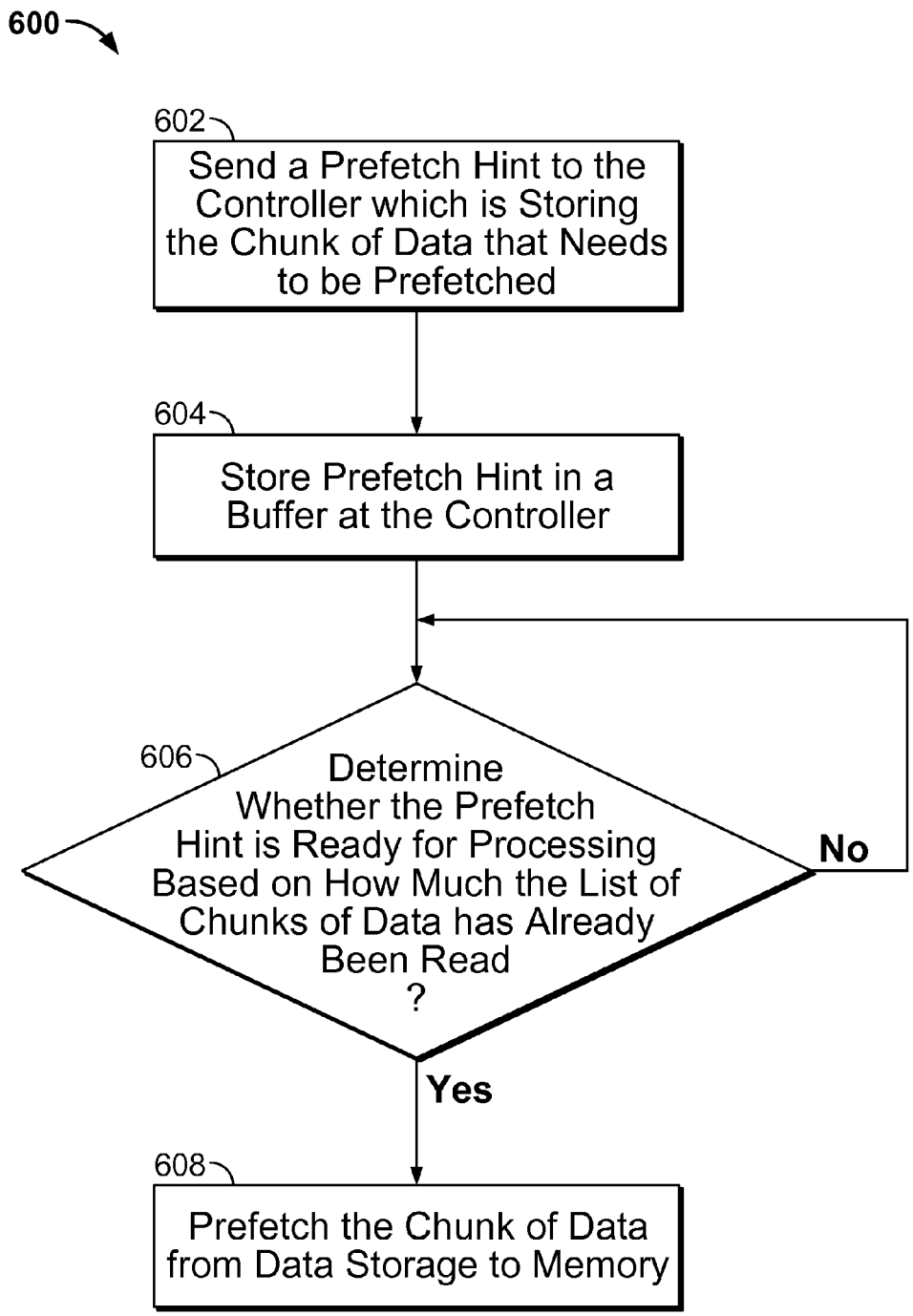
FIG. 6 is a flowchart illustrating an embodiment of a process 600 in a multi-controller data deduplication system for processing a prefetch hint.

FIG. 6 is a flowchart illustrating an embodiment of a process 600 in a multi-controller data deduplication system for processing a prefetch hint. In some embodiments, process 600 may be used to implement step 406 of process 400 in FIG. 4. At 602, a prefetch hint is sent to the controller which stores the chunk of data that is to be prefetched. Instead of processing the prefetch hints without delay, the prefetch hint is stored in a prefetch hint buffer at the controller at 604. In some embodiments, the buffer is a first-in-first-out (FIFO) buffer.

At 606, a determination is made by the controller as to whether the prefetch hint is ready for processing. If the prefetch hint is ready for processing, then the chunk of data is fetched by the controller from its data storage to memory at 608; otherwise, process 600 will repeat again at step 606.

In some embodiments, the determination as to whether the prefetch hint is ready for processing is based on whether the cache at the controller is expected to have sufficient space to hold the anticipated chunk of data without overwriting one or more other chunks of data that have not yet been read. For example, if some chunks of data have already been read, which frees up sufficient space in the cache, and if there are prefetch hints pending, then one or more of the prefetch hints may be processed. In some embodiments, the cache at a controller is a cache that is shared between multiple clients. Therefore, if one chunk of data has been prefetched by one client and the chunk of data is still in the cache, then a prefetch hint that is sent by another client requesting for the same chunk of data can be removed from the prefetch hint buffer and need not be processed.

In some embodiments, the determination as to whether the prefetch hint is ready for processing is based on a measure of how much the list of chunks of data has already been read. One measure is an offset indicating the location of the last chunk of data on the list of chunks of data that has already been read. For example, the offset is zero if zero chunks of data have been read, while the offset is equal to the file size if all the chunks of data have already been read.

In some embodiments, there is a prefetch hint buffer for each stored file. If the client that sends the prefetch hints fails, each controller will get a notification from the network layer that its connection to the client is lost. In this case, each controller may remove the contents of the prefetch hint buffer corresponding to the file as part of an error recovery procedure.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for reading data from data storage, comprising:

receiving at a controller a prefetch hint identifying a chunk of data a requesting node anticipates the requesting node will request that the controller retrieve from data storage;

storing the prefetch hint in a buffer at the controller;

determining that the prefetch hint is ready for processing based at least in part on an offset or other data indicating a place of the chunk of data within a sequence of related chunks of data one or more of which may have been read previously into a cache of the controller; and processing the prefetch hint, in response to determining that the prefetch hint is ready for processing, including by reading the chunk of data from a data storage of the controller and storing the chunk of data in the cache, wherein the prefetch hint comprises a first prefetch hint, the chunk of data comprises a first chunk of data, and the determination that the first prefetch hint is ready for processing includes a determination that a second chunk of data, associated with a second prefetch hint received from the requesting node prior to the first prefetch hint, has been read out from the cache.

2. The method of claim 1, wherein the first and second chunks of data are associated with a file or other data object and the controller is configured to maintain a separate buffer for each of a plurality of files or other data objects being read.

3. The method of claim 1, wherein the requesting node comprises a backup client.

4. The method of claim 1, wherein the requesting node comprises a restore plug-in or other application, client, or agent.

5. The method of claim 1, wherein the requesting node comprises one of a plurality of requesting nodes, each configured to interact with the controller to restore on a target host a file or other data object stored on storage media at least in part by the controller.

6. The method of claim 1, wherein the controller comprises one of a plurality of controllers comprising a multi-controller data storage system.

7. The method of claim 6, wherein one of the plurality of controllers is a master controller and the remaining of the plurality of controllers are worker controllers.

8. The method of claim 7, wherein the master controller includes information for determining that the chunk of data is retrievable from the data storage of the controller.

9. The method of claim 6, wherein the chunk of data comprises a portion of a file or other stored data object and wherein one or more other chunks of data comprising the file or other stored data object may be stored by one or more other of the controllers comprising the multi-controller data storage system.

10. The method of claim 1, further comprising concatenating the sequence of related chunks of data to read a stored file.

11. The method of claim 10, wherein the buffer corresponds to the stored file.

12. The method of claim 1, wherein the offset indicates a location of a last chunk of data within the sequence of related chunks of data that has already been read.

13. The method of claim 1, further comprising reading the chunk of data from the cache.

14. A system for reading data from data storage, comprising:
- a client; and
- a plurality of controllers coupled with the client, wherein each of the controller includes a separate data storage;
- wherein each of the controllers is configured to:
  - receive a prefetch hint identifying a chunk of data the client anticipates the client will request that the controller retrieve from data storage;
  - store the prefetch hint in a buffer at the controller;
  - determine that the prefetch hint is ready for processing based at least in part on an offset or other data indicating a place of the chunk of data within a sequence of related chunks of data one or more of which may have been read previously into a cache of the controller; and
  - process the prefetch hint, in response to determining that the prefetch hint is ready for processing, including by reading the chunk of data from a data storage of the controller and storing the chunk of data in the cache, wherein the prefetch hint comprises a first prefetch hint, the chunk of data comprises a first chunk of data, and the determination that the first prefetch hint is ready for processing includes a determination that a second chunk of data, associated with a second prefetch hint received from the client prior to the first prefetch hint, has been read out from the cache.

15. The system of claim 14, wherein the first and second chunks of data are associated with a file or other data object and the controller is configured to maintain a separate buffer for each of a plurality of files or other data objects being read.

16. The system of claim 14, wherein the controller comprises one of a plurality of controllers comprising a multi-controller data storage system, and wherein one of the plurality of controllers is a master controller and the remaining of the plurality of controllers are worker controllers.

17. A computer program product for reading a plurality of chunks of data from data storage, the computer program product being embodied in a non-transitory computer readable storage medium and comprising computer instructions for:
- receiving at a controller a prefetch hint identifying a chunk of data a requesting node anticipates the requesting node will request that the controller retrieve from data storage;
- storing the prefetch hint in a buffer at the controller;
- determining that the prefetch hint is ready for processing based at least in part on an offset or other data indicating a place of the chunk of data within a sequence of related chunks of data one or more of which may have been read previously into a cache of the controller; and
- processing the prefetch hint, in response to determining that the prefetch hint is ready for processing, including by reading the chunk of data from a data storage of the controller and storing the chunk of data in the cache, wherein the prefetch hint comprises a first prefetch hint, the chunk of data comprises a first chunk of data, and the determination that the first prefetch hint is ready for processing includes a determination that a second chunk of data, associated with a second prefetch hint received from the client prior to the first prefetch hint, has been read out from the cache.

18. The computer program product of claim 17, wherein the first and second chunks of data are associated with a file or other data object and the controller is configured to maintain a separate buffer for each of a plurality of files or other data objects being read.

19. The computer program product of claim 17, wherein the controller comprises one of a plurality of controllers comprising a multi-controller data storage system, and wherein one of the plurality of controllers is a master controller and the remaining of the plurality of controllers are worker controllers.

* * * * *